(12) United States Patent
Zhu et al.

(10) Patent No.: US 8,584,957 B2
(45) Date of Patent: Nov. 19, 2013

(54) INTELLIGENT FASTENER

(75) Inventors: Shengbo Zhu, San Jose, CA (US); Su Shiong Huang, Bellevue, WA (US)

(73) Assignee: Silicon Valley Microe Corp., San Jose, CA (US)

( * ) Notice: Subject to any disclaimer, the term of this patent is extended or adjusted under 35 U.S.C. 154(b) by 51 days.

(21) Appl. No.: 13/374,911

(22) Filed: Jan. 23, 2012

(65) Prior Publication Data

US 2013/0186951 A1    Jul. 25, 2013

(51) Int. Cl.
*G06K 19/06* (2006.01)
*F16B 31/02* (2006.01)
*G06F 17/00* (2006.01)

(52) U.S. Cl.
USPC .......................... 235/492; 73/761; 235/375

(58) Field of Classification Search
USPC ...................... 235/375, 376, 492; 73/761
See application file for complete search history.

(56) References Cited

U.S. PATENT DOCUMENTS

| | | | |
|---|---|---|---|
| 7,703,669 B2* | 4/2010 | Amirehteshami et al. | 235/375 |
| 8,033,181 B2* | 10/2011 | Kibblewhite et al. | 73/761 |
| 2007/0017295 A1* | 1/2007 | Ohta et al. | 73/761 |

* cited by examiner

*Primary Examiner* — Jamara Franklin

(57) ABSTRACT

An intelligent fastener having a head and an externally threaded shank for threaded engagement with a structural member. The head has a recess formed in the top surface for mounting an RFID tag with a memory containing information specific to the fastener—such as fastener identification, specified torque value and other information—an antenna for enabling bidirectional communication with an RFID tag reader, and a torque value sensor for determining the torque applied to the fastener by a fastener installation tool. Once installed, the existing torque on a collection of fasteners is measured by using an RFID tag reader to scan the information stored in the memory of each fastener.

20 Claims, 7 Drawing Sheets

US 8,584,957 B2

INTELLIGENT FASTENER

BACKGROUND OF THE INVENTION

This invention relates to threaded fasteners. More particularly, this invention relates to industrial threaded fasteners having intelligent properties.

Threaded fasteners have long been used to fasten together myriad types of mechanical parts. Some examples of the different types of mechanical parts which can be fastened together by threaded fasteners are structural members, such as bridge girders, support beams in buildings, and aircraft structural members. Typically, during installation each threaded fastener is inserted into an aperture in the piece to be captured and threaded into a designated portion of the mating piece, such as a nut secured to, or a threaded aperture formed in, the mating piece. In many applications, each fastener must be threadably tightened to a specific torque amount within a narrow band of specified tolerances. The specified tolerances are usually part of the specifications created for a given project, and may be presented in paper form or in electronic form (such as stored in a flash drive or other computer-readable memory) for use with a portable computer which can be transported to the job site. Both manual torque wrenches and power driven torque tools are typically used to tighten the fastener to a value lying within the specified torque range. Typically, the installer must consult the specifications in order to determine the proper range of permissible torque values, and then tighten the fastener. Ideally, the installer would manually create a record of each installed fastener by site location and torque value and submit such record to an inspector or other person or office responsible for maintaining project data. However, this is not always done.

Many projects require that the installed fasteners be checked for proper torque value immediately after installation, and later on a regular basis, in order to ensure the safety of the entire structural assembly. This inspection and check must be performed by a qualified person (usually a trained inspector) having an authentic copy of the original specifications, and is usually done manually by the inspector with a torque wrench, a power driven torque tool or a torque measurement device applied to each installed fastener. In addition, the inspector typically conducts a visual survey to determine whether any fasteners are missing. The results of the inspection and check must be reported to the designated person or office which maintains the inspection records for future reference.

Because the inspection process must be manually and visually performed on each individual fastener, the process is very time consuming and subject to human error—e.g., by failing to correctly apply the proper torque specification value to one or more fasteners, failure to accurately measure the torque on a given fastener or failure to notice the absence of a fastener from a designated fastener site. In addition, as noted above, a record of the initial installation of fasteners is not always created to the detriment of those responsible for maintaining the integrity and safety of fastened structures.

SUMMARY OF THE INVENTION

The invention comprises a threaded fastener with intelligent properties which facilitates fastener installation and follow-up checking, and an intelligent fastener system and method which affords hitherto unavailable advantages to the installation and follow-on monitoring of structures fastened together using threaded fasteners.

From an individual apparatus standpoint, the invention comprises an intelligent fastener comprising a body member having a head portion and an externally threaded shank portion extending from the head portion; the head portion having a lower surface and an upper surface and a throughbore formed therethrough; the upper surface having a recess formed therein; an RFID tag mounted in recess; an antenna mounted in the recess and coupled to the RFID tag; a sensor having a body portion mounted in the recess and coupled to the RFID tag; the sensor having an arm portion extending away from the sensor body portion and terminating in an end, the arm portion being slidably received in the throughbore and the end of the arm portion extending below the lower surface so that the end of the arm can contact the surface of an apertured workpiece when the fastener is inserted into the aperture.

The RFID tag has a memory for storing information specific to the fastener, such as a unique identification, a torque value specified for the fastener, an installation date, a site location at which the fastener is installed, the date of original installation, and the date of the most recent inspection of the fastener.

In the preferred embodiment, sensor comprises a two-state microswitch which provides a binary torque condition signal.

From a system standpoint, the invention is a fastener installation and inspection system, the system comprising:

a fastener having a body member with a head portion and an externally threaded shank portion extending from the head portion, the head portion having a lower surface and an upper surface and a throughbore formed therethrough; the upper surface having a recess formed therein; an RFID tag mounted in the recess, the RFID tag having a memory for storing information specific for the fastener; an antenna mounted in the recess and coupled to the RFID tag; and a sensor having a body portion mounted in the recess and coupled to the RFID tag; the sensor having an arm portion extending away from the sensor body portion and terminating in an end, the arm portion being slidably received in the throughbore and the end of the arm portion extending below the lower surface so that the end of the arm can contact the surface of an apertured workpiece when the fastener is inserted into the aperture; and an RFID tag reader for interrogating the RFID tag and receiving the information from the RFID tag.

The information stored in the RFID tag memory includes a unique identification for the fastener, a torque value specified for the fastener, the original installation date of the fastener, the site location at which the fastener is installed, and the date of the last inspection of the fastener. The information stored in the RFID tag memory can be updated when appropriate using the RFID tag reader to transmit the updated information to the RFID tag.

The sensor preferably comprises a two-state microswitch for sensing the torque state of the fastener.

The system further includes a fastener installation tool for driving the fastener into a threaded aperture to a specified torque value. For this purpose, the fastener installation tool includes a torque control unit coupled to the RFID tag reader for limiting the torque applied by the fastener installation tool to the fastener to the torque value.

Fasteners fabricated according to the invention provide several advantages over known threaded fasteners. Firstly, initial installation of a fastener to the correct torque specification is greatly facilitated by providing the correct torque information in the fastener RFID tag in a form which can be extracted by the installation tool when the installer is prepared to install the fastener. In addition, the fastener can be automatically driven to the proper torque value by the installation tool, and the torque value can be checked immediately after the fastener is installed to ensure that the fastener is correctly installed. Moreover, the integrity of the installation of a collection of fasteners can be quickly checked at any time using a scanning inspection technique, and any needed corrective action can be taken using the installation tool. Further, the scanning inspection technique avoids the need to manually check the current value of each installed fastener, which substantially reduces the time required for the inspection process to be conducted. Also, the provision of the fastener identification, type, specified torque value, site location, installation date and inspection date information in the fastener in a form readable by the associated tag reader enables a complete history of the fastener installation project to be compiled and saved in a host computer for future maintenance purposes. Lastly, the above advantages are all afforded at relatively low additional cost per fastener.

For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 1:
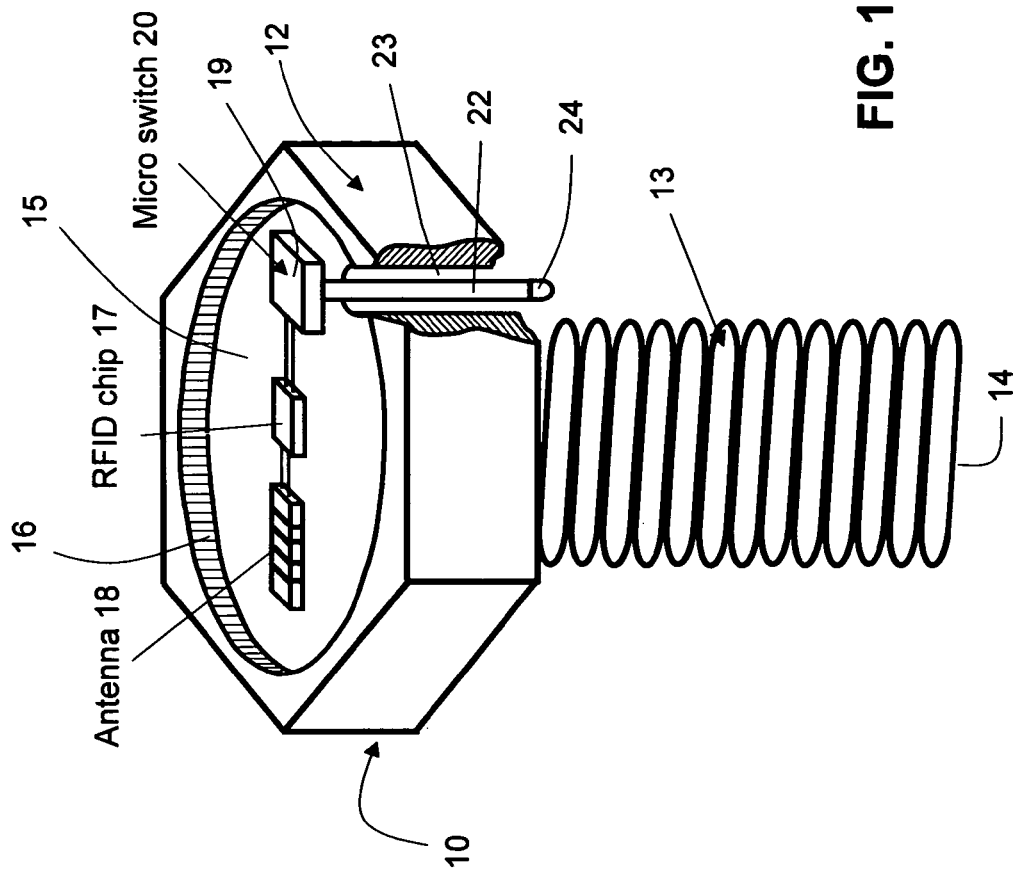
FIG. 1 is a perspective view of a preferred embodiment of a threaded fastener with intelligent properties and incorporating the invention.
Figure 2:
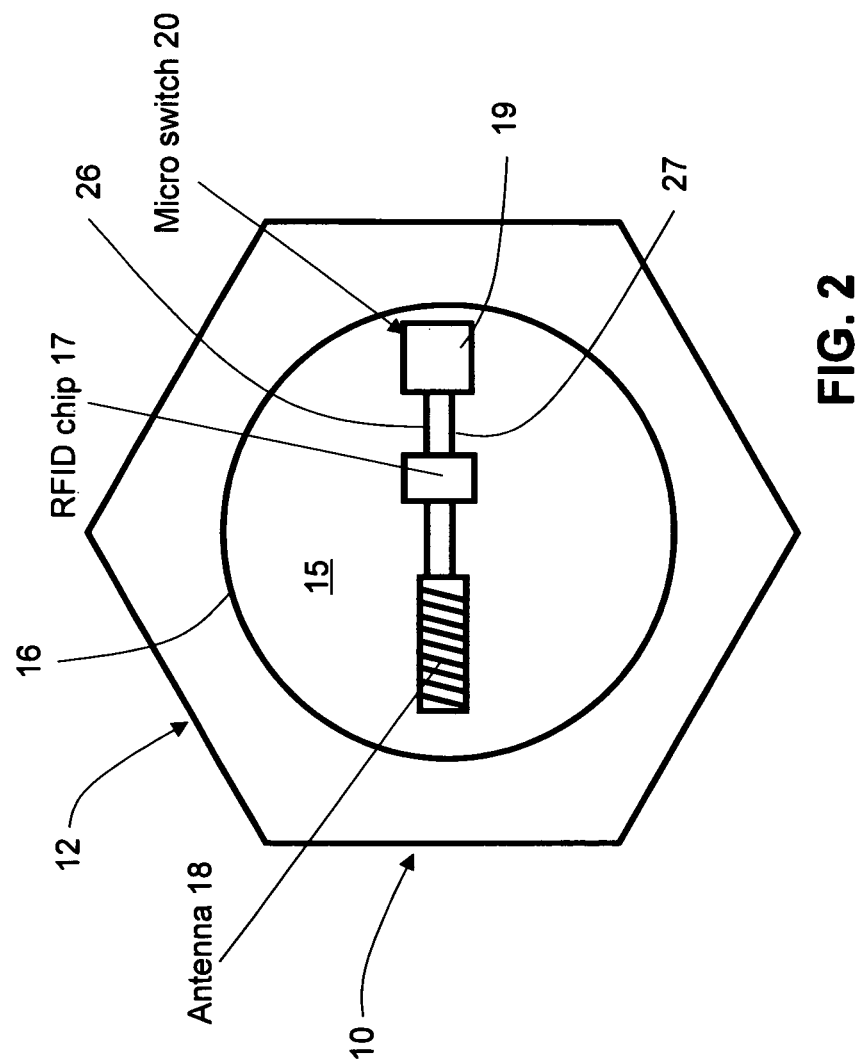
FIG. 2 is a top plan view of the fastener of FIG. 1 showing the orientation of the intelligent components.

Turning now to the drawings, FIGS. 1 and 2 illustrate a single fastener according to the invention. As seen in these Figs., a fastener generally designated with reference numeral 10 has a head 12 and a threaded shank 13 terminating in a free end 14. Fastener head 12 has a central recess defined by a recessed upper surface 15 and a boundary wall 16 of sufficient depth and boundary dimensions to accommodate an RFID chip 17, an antenna 18 and an upper body portion 19 of a microswitch 20. Elements 17, 18, and 19 are all carried by recessed upper surface 15 of head 12. The remaining portion of microswitch 20 comprises a switch activating arm 22 which extends downwardly through a throughbore 23 formed in head 12 and terminates in a free end 24. The free end 24 of switch activating arm 22 terminates at a predetermined level below a lower surface 25 (shown in FIG. 4) of head 12 for a purpose described below. The relative diameter dimensions of throughbore 23 and switch activating arm 22 are chosen to enable switch activating arm 22 to slidably reciprocate within throughbore 23.

Figure 3:
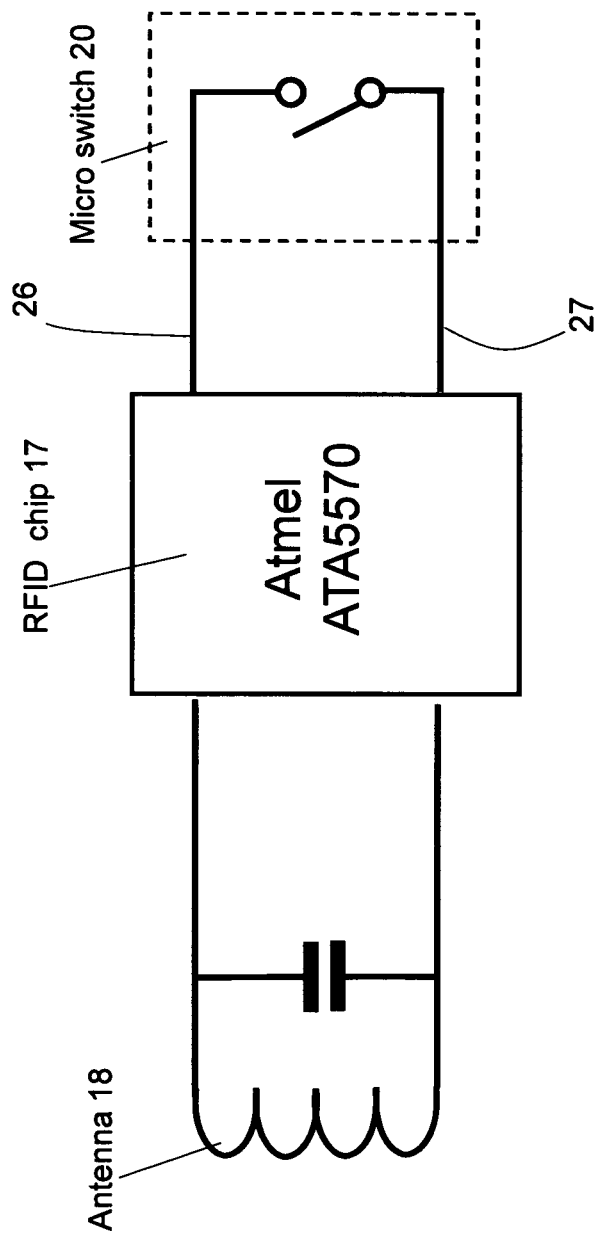
FIG. 3 is a schematic diagram illustrating the intelligent components of the fastener of FIG. 1.

With reference to FIG. 3, the components providing the intelligent properties for fastener 10 include microswitch 20, RFID chip 17, and antenna 18. RFID chip 17 is a conventional RFID chip commonly referred to in the art as an RFID tag, preferably an Atmel type ATA5570 integrated circuit available from Atmel Corporation of San Jose, Calif., which incorporates the normal components necessary to enable bidirectional communication between the RFID integrated circuit 17 and an associated RFID tag reader via antenna 18. RFID chip 17 further includes a read/write memory section for storing and allowing the retrieval of certain information pertaining to fastener 10 in response to interrogation by the associated RFID tag reader. The types of information are described more fully below. In addition, RFID chip 17 incorporates the necessary power transfer circuit components to provide electrical power to the integrated circuit components from electro-magnetic interrogation signals received from the associated RFID tag reader via antenna 18. Antenna 18 is a conventional RF antenna designed for use with an RFID tag, such as a Coilcraft type 4312 RV series transponder coil. Since such components are well known, they are not further described in detail to avoid prolixity.

Microswitch 20 has two conductors 26, 27 (shown in FIGS. 2 and 3) coupled to a data input of RFID chip 17. This enables RFID chip to monitor the binary status of microswitch 20—i.e., either closed or open. In the preferred embodiment, microswitch 20 functions as a binary torque value sensor for sensing whether a fastener 10 has been tightened to the correct torque value.

Figure 4:
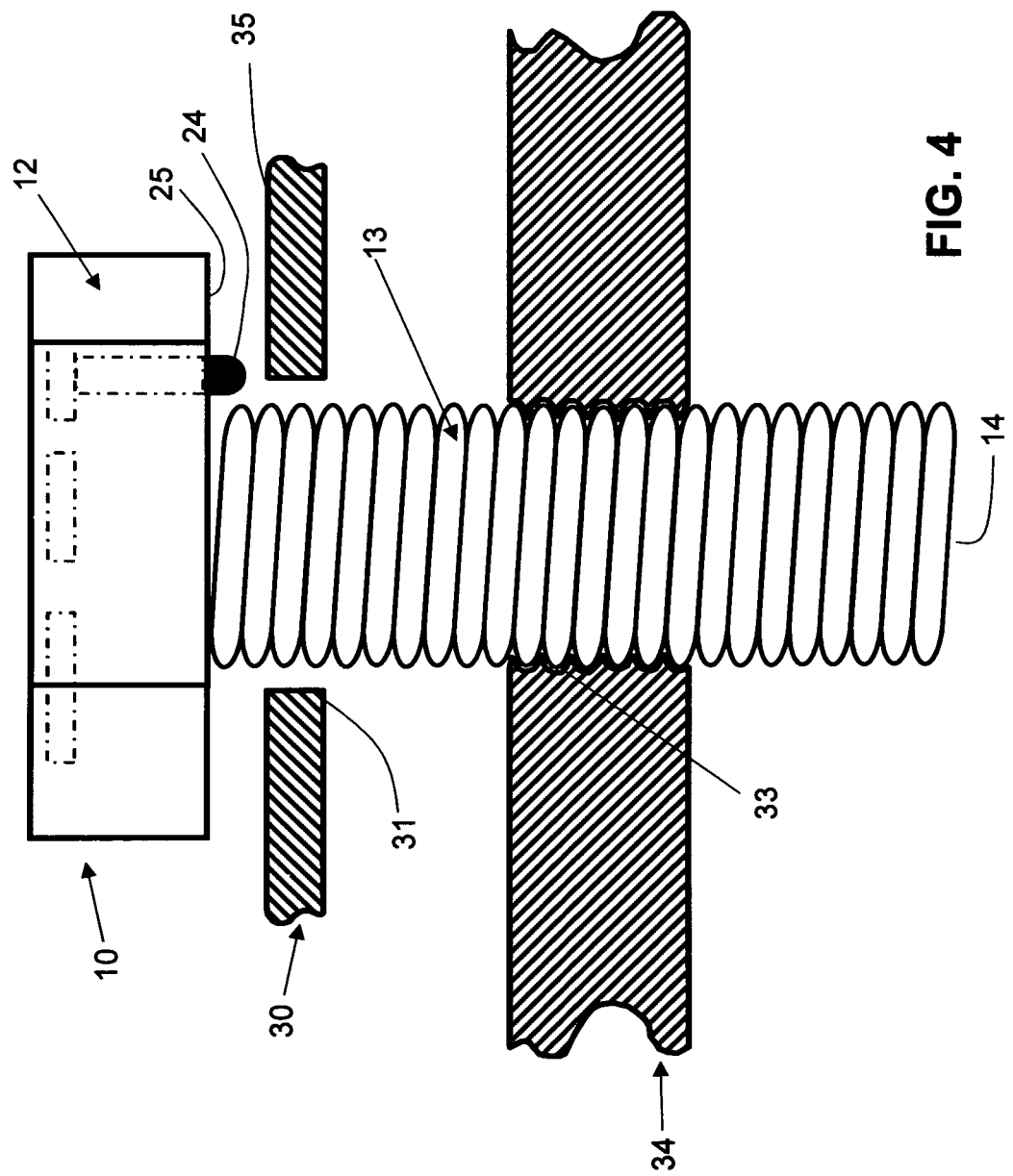
FIG. 4 is a side elevational view partially in section of the fastener of FIG. 1 with the threaded shaft inserted through an aperture in a captured structural member and the threaded shaft threaded onto a mating threaded portion of another structural member.

FIG. 4 illustrates a fastener incorporating the invention partially installed in two structural members. In this Fig., elements 17, 18 and 20 are illustrated in phantom. As seen in this Fig., the threaded shaft 13 is shown as inserted through an aperture 31 in a first structural member 30 to be captured; and the threaded shaft 13 is also threaded into a threaded portion 33 of another structural member 34. For a structural member 34 having sufficient thickness, threaded portion 33 of structural member 34 may comprise a threaded aperture formed in the structural member 34 as shown; alternatively, threaded portion 33 may comprise a discrete threaded nut permanently secured (e.g., by welding) to the reverse surface of structural member 34. In either case, the purpose of threaded portion 33 is to provide a clamping force of proper magnitude between first structural member 30 and additional structural member 34 when fastener 10 is driven fully home.

As noted above, fastener 10 must be tightened to a torque value typically lying within a narrow range established by the project specifications. This state of fastener 10 is signified by a change of status of microswitch 20 (either closed or open depending on the circuit parameters) when the free end 24 of arm 22 of microswitch 20 engages the upper surface 35 of structural member 30 and is driven upward in FIG. 4 to a calibrated position. This change of state can be detected by RFID chip 17 and stored in memory for later use. After installation of fastener 10, the value of the fastener torque can be checked by interrogating RFID tag 17 with the associated RFID tag reader. If the torque has dropped below the lower limit established by the specifications, the axial position of microswitch arm 22 will have changed sufficiently so that the status of microswitch 20 will have reverted to the out-of-torque range state. This change of switch status can be detected by RFID tag 17, stored in memory, and transmitted to the associated RFID tag reader upon interrogation.

Figure 5:
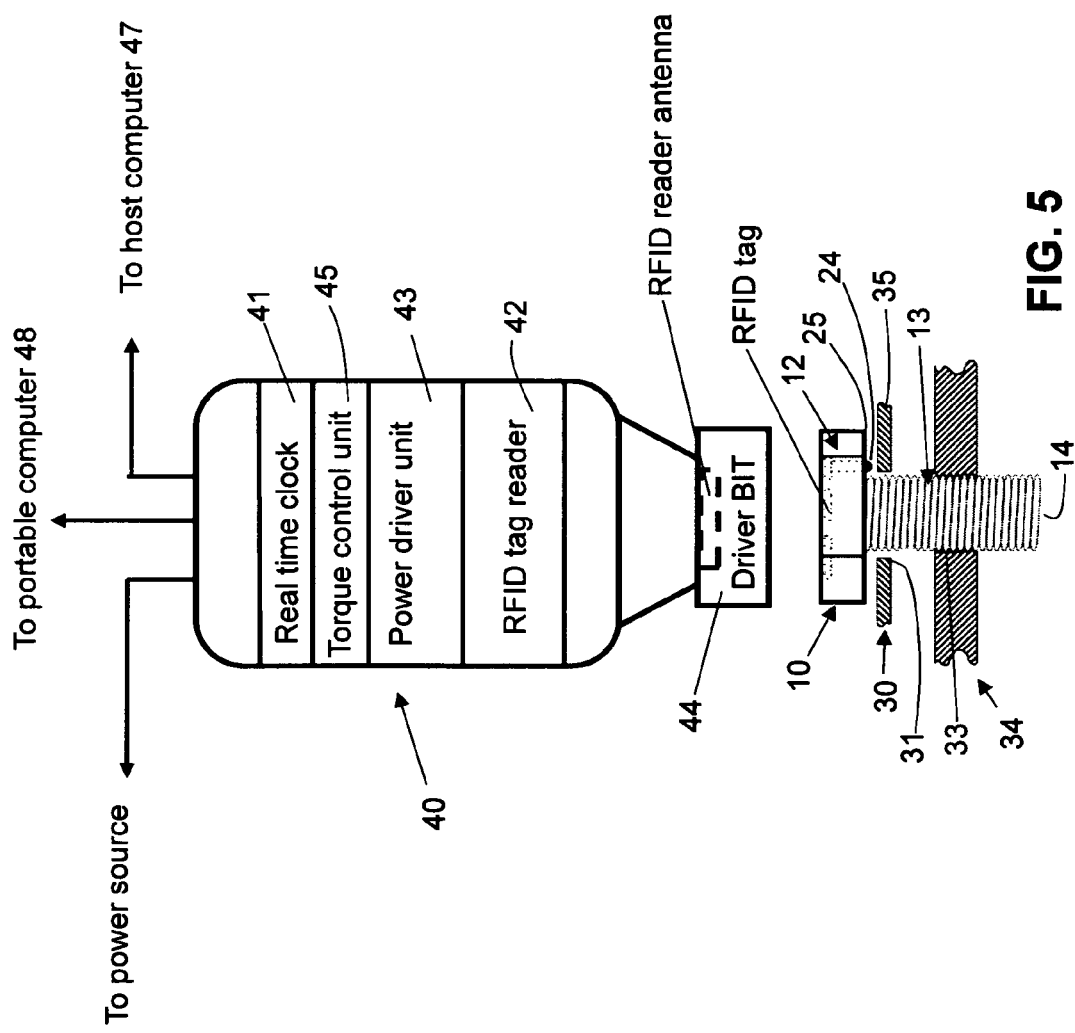
FIG. 5 is a schematic view of a power operated fastener installation tool for use in the installation and torque adjustment of fasteners.

FIG. 5 is a schematic view of a power operated fastener installation tool designated with reference numeral 40 for use in the initial installation of fasteners 10 and later adjustment of fasteners 10 to the proper torque. As seen in this Fig. the tool 40 preferably includes a real time clock 41 for providing real time installation information, an RFID tag reader 42 for reading information from the RFID tag 17 of a fastener to be installed, a power driver unit 43 for providing a driving force to a driver bit 44 used to tighten a fastener 10, and a torque control unit 45 for controlling the power driver unit 43 in such a manner that the fastener 10 is tightened to the specified torque value. Installation tool 40 has a power input and data communication conductors for enabling connection to a host computer 47 and a portable computer 48. Real time clock 41 is a conventional circuit for providing real time information. RFID tag reader 42 is a conventional device capable of generating interrogation signals for specific RFID tags and receiving and processing information received from a responding RFID tag 17. Power driver unit 43 is a conventional electromechanical device used to provide a rotational driving force to driver bit 44. Driver bit 44 is a conventional drive bit having a configuration compatible with the shape of head 12 of fastener 10 (e.g., hex head). Torque control unit 45 is a conventional unit capable of controlling the maximum amount of torque generated by power driver unit 43.

Figure 6:
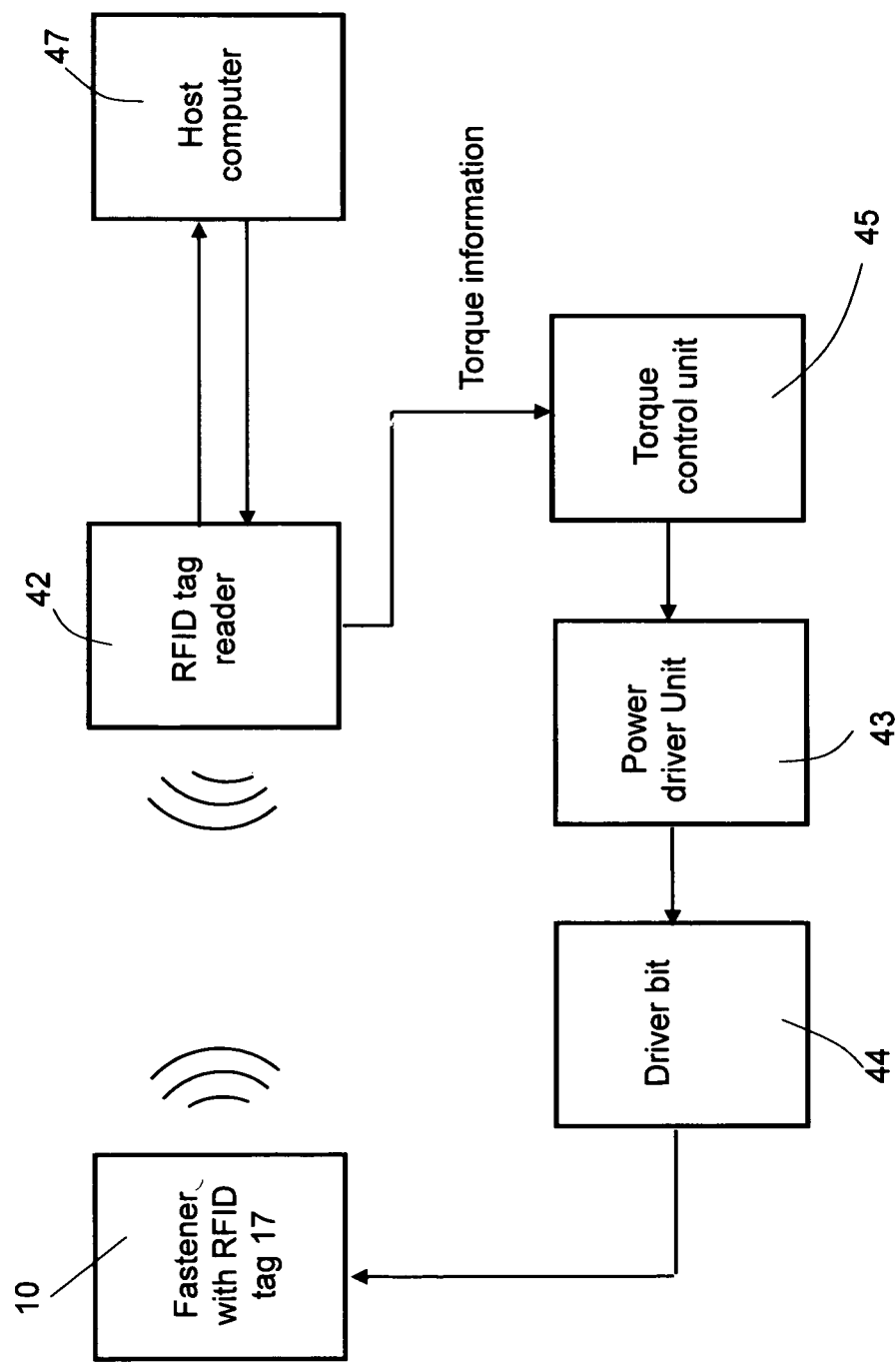
FIG. 6 is a block diagram illustrating the initial installation process for the fastener of FIG. 1.

FIG. 6 is a block diagram illustrating the use of tool 40 in installing and adjusting the torque setting of fastener 10. As seen in this Fig., RFID tag reader 42 is placed in the vicinity of and within the reception range of fastener 10. RFID tag reader 42 is then operated to generate an interrogation signal directed to fastener 10. Upon receipt of the interrogation signal, RFID tag 17 of fastener 10 responds by transmitting the requested information to RFID tag reader 42. RFID tag reader 42 then examines the received information, which will include the unique identification of the fastener 10 and the desired torque value for that fastener 10. RFID tag reader 42 next supplies the desired torque value to torque control unit 45. When the torque value is received, torque control unit 45 uses this torque value to control the operation of power driver unit 43. Driver bit 44 is maneuvered onto head 12 of fastener 10 and power driver unit 43 is activated. As driver bit 44 is rotated by power driver unit 43, fastener 10 is driven into the threaded aperture 33 of structural member 34 (FIG. 4) drawing the structural members 30, 34 together until torque control unit 45 senses that the torque exerted on fastener 10 has reached the specified value. Operation of the power driver unit 43 is then terminated by the torque control unit 45. RFID tag reader 42 then interrogates RFID tag 17 of fastener 10 and transmits the installation date information from real time clock 41 to RFID tag 17, which stores this information in memory.

After initial installation, the actual torque value of the now-installed fastener 10 can be checked by operating RFID tag reader 42 to interrogate RFID tag 17 of fastener 10. When a response is received by RFID tag reader 42, the received information will include the unique identification of the fastener 10, the desired torque value for that fastener, and the state of microswitch 20. If the state of microswitch 20 indicates that the torque value is not correct, the initial installation process can be repeated until the torque value is correct. If the initial installation process fails after one or more attempts, the installer may take elective action to determine the cause of the failure, such as examining the fastener and replacing it if found to be defective, examining the threaded aperture 33 of structural member 34 and determining whether it is damaged.

After the installation process has been successfully concluded, the information received by RFID tag reader 42 from RFID tag 17 of the now-installed fastener 10 may be transmitted to host computer 47 for further processing and/or storage for later retrieval. This information will normally include the unique identification of the fastener 10, the desired torque value, whether the torque value of the fastener is within the specification value, the installation date and (optionally) time of day and the site location of the fastener. At any stage of the installation process, the information received by RFID tag reader 42 may be transmitted to host computer 47 for further processing and/or storage for later retrieval. Similarly, host computer 47 may send data and instructions to RFID tag reader 42 to update the data in RFID tag 17, perform certain data retrieval operations from RFID tag 17, or take other action such as scanning a collection of RFID tags 17 located in different fasteners 10.

Figure 7:
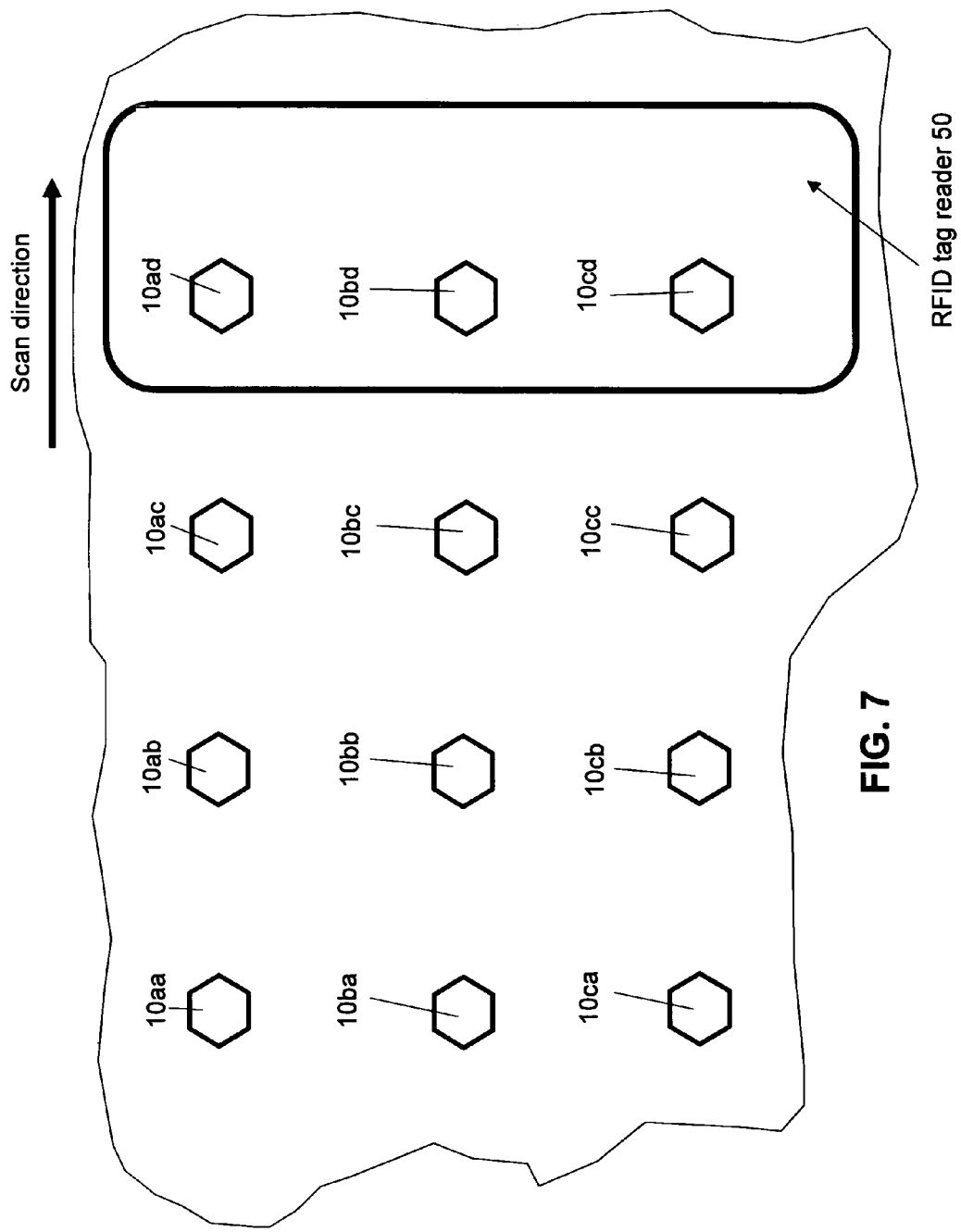
FIG. 7 is a schematic view illustrating a plurality of installed fasteners and the scanning inspection process.

Once a collection of fasteners 10 has been successfully installed, the integrity of the installation can be quickly checked at any time using the scanning inspection technique illustrated in FIG. 7. Normally, this scanning inspection process will be carried out by an inspector having more specialized training than a fastener installer. Also, the first scanning inspection will normally be conducted shortly after the entire installation is completed or the installation of a predetermined set of fasteners has been completed.

FIG. 7 illustrates an array of twelve fasteners 10*aa*, 10*ab*, . . . , 10*cd* each installed at a different location along a structural panel 30. A portable RFID tag reader 50 having the capability of interrogating the individual RFID tags 17 carried by the individual fasteners 10*aa*, 10*ab*, . . . , 10*cd* is manually scanned in the desired direction (left-to-right in FIG. 7) across the array. Preferably, RFID tag reader 50 has an antenna defining a transmission/reception area which encompasses a plurality of fasteners 10*aa*, 10*ab*, . . . , 10*cd* so that several (three in the FIG. 7 embodiment) fasteners may be scanned at the same time. Each responding fastener 10*aa*, 10*ab*, . . . , 10*cd* supplies the requested information to RFID tag reader 50, and this information can be displayed to the inspector using a dedicated display incorporated into the RFID tag reader 50 or a portable computer monitor.

The requested information will normally include the unique identification for each fastener responding to the interrogation signals generated by RFID tag reader 50, the physical location of each responding fastener on panel 30, the status of the torque microswitch 20, and the original installation date. If no response is received to an interrogation of a given fastener 10*aa*, 10*ab*, . . . , 10*cd*, this may signify that a fastener is currently missing or that the intelligent circuit components are inoperative. Either condition can be fixed at once or at a later scheduled date by simply replacing the missing or inoperative fastener 10*aa*, 10*ab*, . . . , 10*cd*. If the information received from a responding fastener 10*aa*, 10*ab*, . . . , 10*cd* indicates that the torque is out of specification value, the inspector can use the installation tool 40 described above with reference to FIG. 5 to attempt to correct this problem. All information received by RFID tag reader 50 can be shared with host computer 47 and used for maintenance, history and any other appropriate purposes. RFID tag reader 50 also transmits the inspection date and site location to each successfully interrogated RFID tag 17, which stores this information in memory.

The basic type of information which can be stored in RFID tag 17 in a fastener 10 includes the identification of the particular fastener, which may be a serial number in a series of numbers or a combination of distinct characters in a collection of characters; the type designation of the fastener; the specified torque value for the fastener; the installation location of the fastener; the original installation date; and the date of the most recent inspection. As will be apparent to those of ordinary skill in the art, other types of information may be also be stored in RFID tag 17 depending on the requirements of a given application.

It is noted that there are three possible states of the microswitch 20 in each fastener 10. The state "1" may signify that the fastener torque is within the specification value, while the state "0" may signify that the fastener torque is not within the specification value. If no value for the microswitch is received by RFID reader 50 during an interrogation, this can be interpreted as a missing fastener 10, which can be verified by visual inspection, or an inoperative microswitch, in which case a new fastener 10 can be installed as a replacement.

As will now be apparent, threaded fasteners with intelligent components incorporating the invention as described above afford several advantages over known threaded fasteners. Firstly, initial installation of a fastener to the correct torque specification is greatly facilitated by providing the correct torque information in the fastener RFID tag in a form which can be extracted by the installation tool when the installer is prepared to install the fastener. In addition, the fastener can be automatically driven to the proper torque value by the installation tool, and the torque value can be checked immediately after the fastener is installed to ensure that the fastener is correctly installed. Moreover, the integrity of the installation of a collection of fasteners can be quickly checked at any time using the scanning inspection technique, and any needed corrective action can be taken using the installation tool. Further, the scanning inspection technique avoids the need to manually check the current value of each installed fastener, which substantially reduces the time required for the inspection process to be conducted. Also, the provision of the fastener identification, type, specified torque value, site location, installation date and inspection date information in the fastener in a form readable by the associated tag reader enables a complete history of the fastener installation project to be compiled and saved in a host computer for future maintenance purposes. Lastly, the above advantages are all afforded at relatively low additional cost per fastener.

Although the above provides a full and complete disclosure of the preferred embodiments of the invention, various modifications, alternate constructions and equivalents will occur to those skilled in the art. For example, while the invention has been described with reference to a specific RFID tag 17, other RFID tags may be used according to the demands of a particular application. In addition, while the torque value sensor has been described as a simple microswitch having two operative states—i.e., a binary device, if desired other types of torque sensors may be employed which provide variable value measurements such as variable resistance or variable capacitance. Such sensors may be incorporated into fastener 10 using complementary variable signal processing techniques, such as the signal processing technique described in U.S. Patent Application Publication number US 2007/0222583 A1, the disclosure of which is hereby incorporated by reference. Therefore, the above should not be construed as limiting the invention, which is defined by the appended claims.

What is claimed is:

1. An intelligent fastener comprising:
    a body member having a head portion and a shank portion extending from said head portion, said shank portion having a threaded outer surface,
    said head portion having a lower surface and an upper surface and a throughbore formed therethrough and laterally offset outwardly of said threaded outer surface;
    said upper surface having a recess formed therein;
    an RFID tag mounted in said recess;
    an antenna mounted in said recess and coupled to said RFID tag;
    a sensor having a body portion mounted in said recess and coupled to said RFID tag;
    said sensor having an arm portion extending away from said sensor body portion and terminating in an end, said arm portion being slidably received in said throughbore outwardly of said threaded outer surface and said end of said arm portion extending below said lower surface so that said end of said arm contacts the surface of a workpiece having an aperture when said shank portion of said fastener is inserted into said aperture and said arm is translated along said throughbore towards said head portion as said shank portion advances into said aperture of said workpiece.

2. The fastener of claim 1 wherein said RFID tag has a memory for storing information specific to said fastener.

3. The fastener of claim 2 wherein least some of said information is stored in a section of said memory which is readable.

4. The fastener of claim 2 wherein said information includes a unique identification for said fastener.

5. The fastener of claim 2 wherein said information includes a torque value specified for said fastener.

6. The fastener of claim 2 wherein said information includes an installation date for said fastener.

7. The fastener of claim 1 wherein said information includes a site location at which said fastener is installed.

8. The fastener of claim 1 wherein said information includes a date of inspection for said fastener.

9. The fastener of claim 1 wherein said sensor comprises a two-state microswitch.

10. A fastener installation and inspection system, said system comprising:
    a fastener having a body member with a head portion and a shank portion extending from said head portion, said shank portion having a threaded outer surface,
    said head portion having a lower surface and an upper surface and a throughbore formed therethrough and laterally offset outwardly of said threaded outer surface;
    said upper surface having a recess formed therein;
    an RFID tag mounted in said recess, said RFID tag having a memory for storing information specific for said fastener;
    an antenna mounted in said recess and coupled to said RFID tag; and a sensor having a body portion mounted in said recess and coupled to said RFID tag;
    said sensor having an arm portion extending away from said sensor body portion and terminating in an end, said arm portion being slidably received in said throughbore outwardly of said threaded outer surface and said end of said arm portion extending below said lower surface so that said end of said arm contacts the surface of a workpiece having an aperture when said shank portion of said fastener is inserted into said aperture and said arm is translated alone said throughbore towards said head portion as said shank portion advances into said aperture of said workpiece; and
    an RFID tag reader for interrogating said RFID tag and receiving said information from said RFID tag.

11. The system of claim 10 wherein said information includes a unique identification for said fastener.

12. The system of claim 10 wherein said information includes a torque value specified for said fastener.

13. The system of claim 10 wherein said information includes an installation date for said fastener.

14. The system of claim 10 wherein said information includes a site location at which said fastener is installed.

15. The system of claim 10 wherein said information includes a date of inspection for said fastener.

16. The system of claim 10 wherein said sensor comprises a two-state microswitch.

17. The system of claim 10 wherein said RFID tag reader includes a transmitter for storing information in said memory of said RFID tag.

18. The system of claim 10 wherein said RFID tag reader includes a transmitter for updating said information stored in said memory of said RFID tag.

19. The system of claim 10 further including a fastener installation tool for driving said fastener into a threaded aperture to a specified torque value.

20. The system of claim 19 wherein said information includes a torque value specified for said fastener; and wherein said fastener installation tool includes a torque control unit coupled to said RFID tag reader for limiting the torque applied by said fastener installation tool to said fastener to said torque value.

* * * * *